(12) United States Patent
Eng

(10) Patent No.: US 7,194,009 B2
(45) Date of Patent: Mar. 20, 2007

(54) FULL-SERVICE BROADBAND CABLE MODEM SYSTEM

(76) Inventor: John Wai Tsang Eng, 2600 S. Rock Creek Pkwy. #27-204, Superior, CO (US) 80027

( * ) Notice: Subject to any disclaimer, the term of this patent is extended or adjusted under 35 U.S.C. 154(b) by 1031 days.

(21) Appl. No.: 10/122,828

(22) Filed: Apr. 15, 2002

(65) Prior Publication Data

US 2003/0035442 A1 Feb. 20, 2003

Related U.S. Application Data

(60) Provisional application No. 60/283,842, filed on Apr. 14, 2001.

(51) Int. Cl.
*H04J 1/00* (2006.01)

(52) U.S. Cl. ................................................ 370/480

(58) Field of Classification Search ........ 370/480–482, 370/498, 532–544; 725/105, 106, 118, 120
See application file for complete search history.

(56) References Cited

U.S. PATENT DOCUMENTS

| | | | | |
|---|---|---|---|---|
| 5,570,355 | A * | 10/1996 | Dail et al. | 370/352 |
| 6,081,533 | A * | 6/2000 | Laubach et al. | 370/421 |
| 6,526,070 | B1 * | 2/2003 | Bernath et al. | 370/509 |
| 6,751,230 | B1 * | 6/2004 | Vogel et al. | 370/432 |
| 6,795,426 | B1 * | 9/2004 | Raleigh et al. | 370/345 |
| 2001/0055319 | A1 * | 12/2001 | Quigley et al. | 370/480 |
| 2002/0064233 | A1 * | 5/2002 | Terreault et al. | 375/261 |
| 2002/0115421 | A1 * | 8/2002 | Shahar et al. | 455/403 |

OTHER PUBLICATIONS

PCT/US03/11711 Search report.*
Eng. IEEE Project 802.14. IEEE Communications Magazine, May 1995, pp. 20-23.*
Adams, Michael, OpenCable Architecture, Indianapolis, Indiana: Cisco Press, 2000, pp. 389-394, 107-134, 350-364.
Cable Television Laboratories, Inc., DOCSIS Radio Frequency Interface Specification, SP-RFIv1.1-I04-000407, Apr. 7, 2000.

* cited by examiner

*Primary Examiner*—Dimitry Levitan
(74) *Attorney, Agent, or Firm*—Kevin Roe

(57) ABSTRACT

A method and system are disclosed for enabling full-service communications between a full-service cable modem termination system (fsCMTS) and a plurality of full-service cable modems (fsCMs) for a conventional two way hybrid fiber-coax (HFC) cable television network. Full-service communications include data, voice and video. Video includes broadcast quality MPEG-2 transport packet streams and Internet protocol media streams. A multi-channel full-service media-access-control (fsMAC) coordinates the access to the shared upstream and downstream channels. Several MAC management messages are defined to enable a multi-channel full-service MAC domain to facilitate sharing of an arbitrary number of channels and to enable packet-by-packet true seamless channel change. Multiple upstream channels can be used in various ways to best optimize the use of the spectrum for meeting the quality-of-services needed by different services.

47 Claims, 8 Drawing Sheets

FIG. 4 SYNC Message

Synchronization MAC Message (SYNC)

| | |
|---|---|
| fsMAC Message Header | 582 |
| Time stamp snapshot | 584 |
| fsMAC domain identifier | 586 |
| DCPC Channel ID | 588 |

FIG. 5 CREQ Message

Calibration Request MAC Message (CREQ)

| | |
|---|---|
| fsMAC Message Header | 602 |
| fsCM service identifier | 604 |
| fsMAC domain identifier | 606 |
| DCPC Channel ID | 608 |
| Ethernet MAC address | 610 |
| fsCM type | 612 |
| Pre-equalizer training sequence | 614 |

FIG. 6 CRSP Message

Calibration Response MAC Message (CRSP)

| | |
|---|---|
| fsMAC Message Header | 702 |
| fsCM service identifier | 704 |
| fsMAC domain identifier | 706 |
| Channel ID for this upstream | 708 |
| Timing adjustment | 710 |
| Frequency adjustment | 712 |
| Transmit power adjustment | 714 |
| Transmitter pre-equalizer coefficients | 716 |
| Re-assigned fsMAC domain identifier | 718 |

FIG. 7 BREQ Message

Bandwidth Request MAC Message (BREQ)

| | |
|---|---|
| fsMAC Message Header | 802 |
| fsCM service identifier | 804 |
| fsMAC domain identifier | 806 |
| Framing header type | 808 |
| Amount requested | 810 |

FIG. 8 MMAP Message

Multi-channel Bandwidth Allocation
MAC Message (MMAP)                                900

| fsMAC Message Header | 902 |
|---|---|
| fsMAC domain identifier | 904 |
| Broadcast grants | 906 |
| Unicast grants | 908 |
| Pending grants | 910 |

FIG. 9 MDCD Message fsMAC Domain Channels Descriptor
MAC Message (MDCD)                                1000

| fsMAC Message Header | 1002 |
|---|---|
| fsMAC domain identifier | 1004 |
| Accept new fsCM registration flag | 1006 |
| Number of downstream channels | 1008 |
| Number of upstream channels | 1010 |
| Downstream channel change count | 1012 |
| Upstream channel change count | 1014 |
| List of downstream channel identifiers and TLVs | 1026 |
| List of upstream channel identifiers and TLVs | 1028 |
| List of upstream burst profile identifiers and TLVs | 1030 |

FULL-SERVICE BROADBAND CABLE MODEM SYSTEM

CROSS-REFERENCE TO RELATED APPLICATIONS

The application is a continuation of provisional application filed on Apr. 14, 2001, Ser. No. 60/283,842, which is incorporated herein by reference.

FIELD OF THE INVENTION

The invention relates to "last mile" broadband digital communications systems capable of delivering full-service of voice, video and data to residential and commercial premises. More particularly the invention relates to the field of improvements in the media access control (MAC) protocol of a full-service cable modem system that uses multiple downstream and upstream channels.

BACKGROUND OF THE INVENTION

For the last few years, cable modem systems based on data-over-cable service interface specifications (DOCSIS) have been accepted as a "last mile" high-speed data solution for the consumers.

A two-way Hybrid Fiber-Coax (HFC) cable network is an infrastructure capable of supporting multiple overlaying networks, viz. analog or digital video service, high-speed data, and telephony service. Each of these services use different band of the available spectrum in the downstream and upstream directions, and each service has its own operations and provisioning infrastructure. At customer premises, a full-service subscription requiring multiple boxes of customer premises equipment (CPE) such as a set top box, a telephone network interface unit, and a cable modem. These overlaying services are inefficient in terms of increasing the cost of operations and the cost of consumer ownership.

Convergent Network

It is therefore highly desirable to have a converged network, capable of delivering voice, video and data in a unified communications infrastructure.

Although later versions of data-over-cable media-access-control (MAC) have quality-of-service (QoS) capability by using polling, the protocol essentially is based on sharing an upstream and a downstream channel. Switching users among channels is complex and slow.

Moreover, the cable modem has severe limitations when it comes to supporting digital video services. Conventional digital video (broadcast or video on demand) requires more stringent bit-error-rate than data services. High bit rate of approximately 20 Mbps per HDTV movie channel is required, significantly impacting the capacity of the other services since they reside in the same downstream channel.

Upstream Limitations

The upstream bandwidth of a HFC network is limited by the amount of available spectrum in the upstream in a "sub-split" HFC cable plant which is between 5 to 42 MHz in North America. Because of ingress interference, a good portion of the spectrum is not suitable for wide-band (e.g. 3.2 MHz or 6.4 MHz per channel) and higher-order modulations (e.g. 16, 32, or 64 QAM) to achieve a high capacity for the upstream channel in use. If a 6.4 MHz channel is used, only 6.4/(42−5)=17% of the upstream spectrum is used. The other 83% of the spectrum (in particular for frequencies below 10 MHz) is often unused. Conventional data-over-cable MAC is quite limited in handling multiple channels, in increasing the capacity, and providing the quality of service (QoS) required by different services.

Moreover, since each upstream channel must support the packets generated by different services with different QoS requirements, it is very difficult to achieve high channel utilization under dynamically changing traffic conditions. In particular, the overhead of the MAC management packets such as bandwidth request and initial calibration can be significant and will complicate the scheduling efficiency of the cable modem termination system (CMTS).

The conventional data-over-cable MAC protocol relies on some form of polling to achieve QoS goal of meeting bandwidth, latency and jitter requirements. For a polling interval of 2 ms, each upstream channel requires about 270 Kbps of downstream bandwidth for the MAC operation. This represents a significant amount of bandwidth taken from the downstream channel. Therefore, scalability of using multiple upstream channels in conventional data-over-cable is quite limited.

Broadcast Quality Digital Video

Although the HFC network has sufficient bandwidth to support delivery of a full spectrum of services including data, telephony and video, these services currently are separate infrastructures, each being provisioned by a service provider. As a result, these are sub-optimal usage of the HFC spectrum and costly duplication of equipment at the head end and at customer premises. Voice-over-IP enables convergence of voice and data. However, video service remains using a separate infrastructure.

Therefore, there is an unmet need for a unified communication system that can provide the full need of broadband Internet access, IP telephony, broadcast quality digital video over the same HFC system.

Therefore, there is an unmet need for a MAC that can be used to implement a full-service cable modem system to fulfill the full potential of a HFC network for delivery voice, video and data cost-effectively to the home and the business.

It will be realized after the detailed description of the invention how to overcome the limitations of conventional cable modem systems by the novel MAC and system architecture. A highly efficient and scalable access method that can be used to deliver simultaneously interactive digital video, telephony and high speed internet access as well as interactive gaming shared by a large number of users. The MAC fully utilizes the upstream and downstream spectrum enabling service providers economically deploy the services without a forklift upgrade to the HFC cable plant currently deployed for conventional cable modem service. The unified full-service communication system will reduce the cost of providing three separate provisioning systems for video, data and voice, simplify head end equipment and at the same time reduce the number of on-premises equipment from three to one.

It is an object of the present invention to overcome the disadvantages of the prior art.

BRIEF SUMMARY OF THE INVENTION

This and other objects are achieved by the present invention. In accordance with the present invention a full-service cable modem (fsCM) system 100 capable of delivering video, data and voice over a two-way hybrid fiber-coaxial cable network is described.

A high-capacity, high-efficiency multi-channel full-service MAC, capable of supporting multiple upstream and downstream channels, enables the fsCM system 100 to deliver a full spectrum of services presently requiring multiple delivery systems. The video can be a combination of high-quality broadcast MPEG-2 movie or IP video streams, with the required quality of service.

Further, multiple channels can be used to multiplex packets of all types, enabled by a true seamless channel change described in this invention, thereby maximizing statistical multiplexing gain. Packet-by-packet channel switching enables fast recovery from a channel failure, as required by a high-availability fault-tolerance cable modem system.

The fsCM system 100 consists of, according to the preferred embodiment, illustratively two downstream channels (DCPC and DPC1), two upstream payload channels (UPC1 and UPC2), three upstream control channels (UCC1, UCC2, UCC3) that connect a fsCMTS 102 in the head-end and a plurality of fsCMs 106 at subscriber sites.

The fsCM 106 uses the DCPC for delivering downstream MAC management messages as well as for payloads (MPEG-2 TS or IP packets) and the DPC1 for downstream payload channel to deliver high quality MPEG-2 video or IP packets.

The present invention further includes downstream MAC management messages Multi-channel Bandwidth Allocation MMAP 900 and fsMAC Domain Channels Descriptor MDCD 1000 to enable fsCMTS to allocate upstream transmission to any of the multiple upstream channels on a packet-by-packet basis, and allows a multiple-channel MAC domain to be changed quickly to adapt changing traffic on the network.

The methods and apparatus described herein implement a novel and unique facility that provides for efficient access of a full-service cable modem network capable of simultaneously servicing the communication needs of internet access, telephony, interactive and on-demand digital video to a large number of users over a conventional HFC network.

BRIEF DESCRIPTION OF THE DRAWINGS

FIG. 4 is a block diagram illustrating the structure of the Synchronization SYNC message 500;

FIG. 5 is a block diagram illustrating the structure of the Calibration Request CREQ message 600;

FIG. 6 is a block diagram illustrating the structure of the Calibration Response CRSP message 700;

FIG. 7 is a block diagram illustrating the structure of the Bandwidth Request BREQ message 800;

FIG. 8 is a block diagram illustrating the structure of the Multi-channel Bandwidth Allocation MMAP message 900;

FIG. 9 is a block diagram illustrating the structure of the fsMAC Domain Channels Descriptor MDCD message 1000.

DETAILED DESCRIPTION OF THE INVENTION

Figure 1:
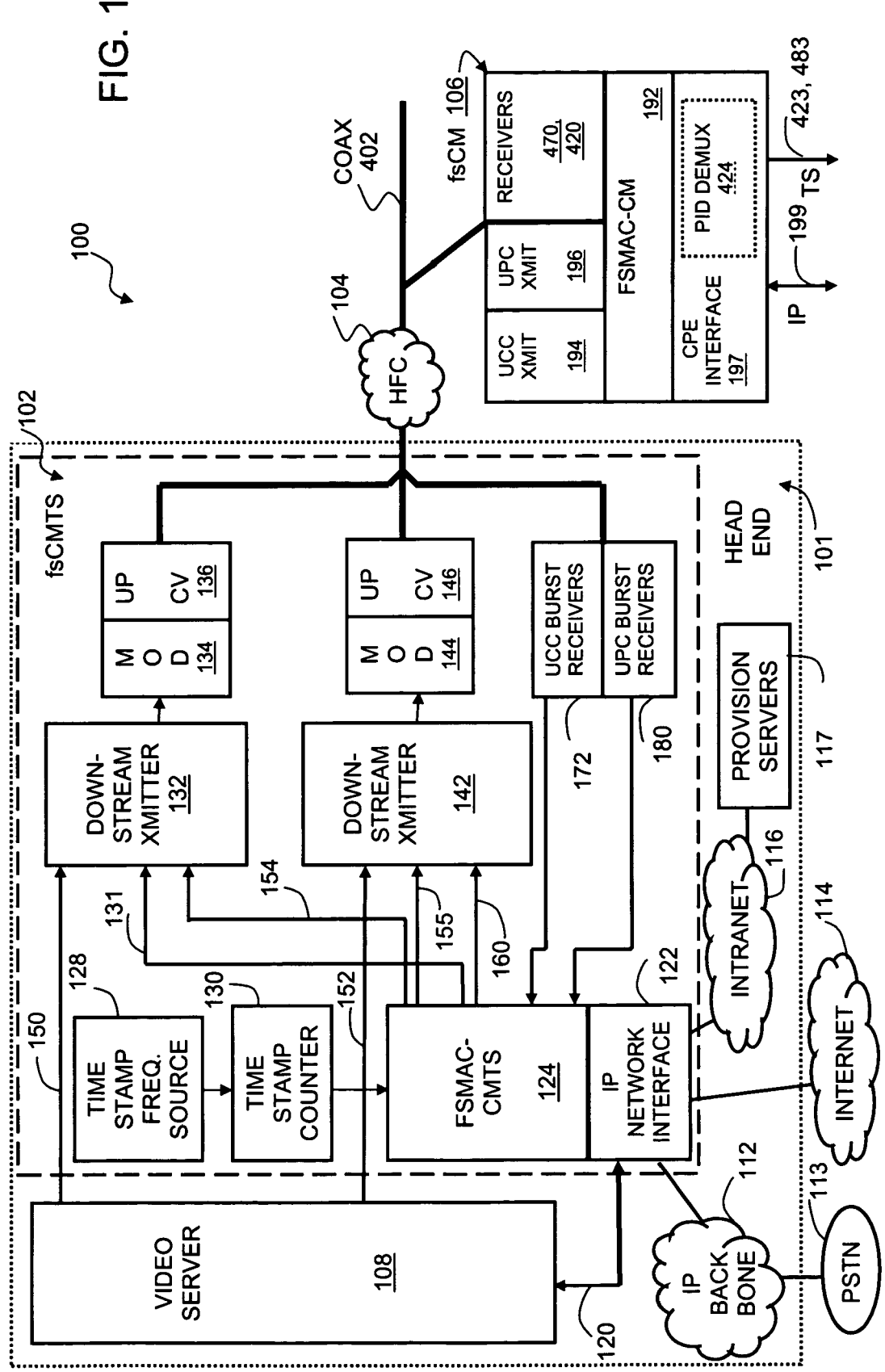
FIG. 1 is a block diagram illustrating an embodiment of the full-service Cable Modem System 100.

Refer to FIG. 1 for a preferred embodiment of a multi-channel fsCM system 100. An fsCMTS 102, typically located at a head end 101, is connected to the fiber-part of a two-way HFC network 104 through an electrical to fiber interface (not shown). A remotely located fsCM 106 is connected to a coax 402 part of the HFC 104. The downstream spectrum (typically 50 to 850 MHz) is divided into typically 6 MHz channels in the downstream for NTSC cable systems. The upstream spectrum typically ranges from 5 to 42 MHz in North America, and the upstream channel bandwidth varies typically from 160 KHz to 6.4 MHz. The architecture and topology of a modern two-way HFC cable plant are known in the art and will not be repeated here.

Figure 3:
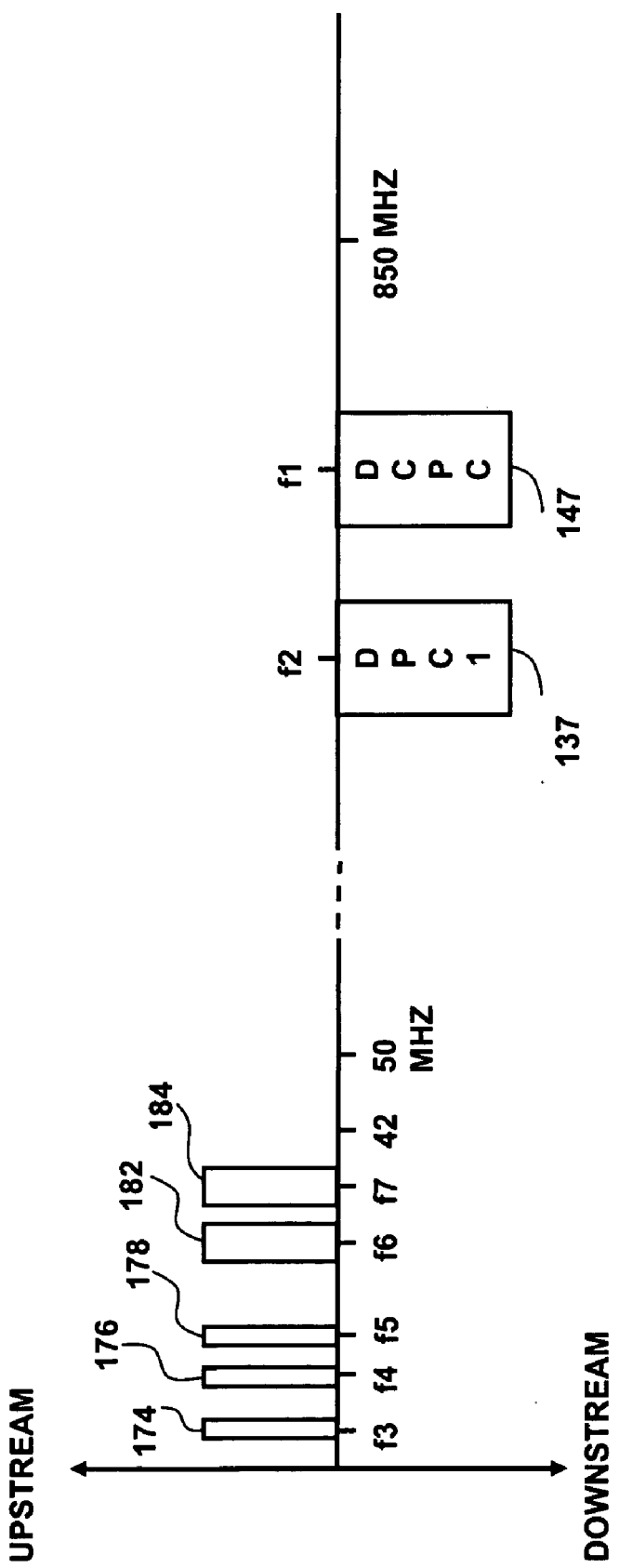
FIG. 3 is a diagram illustrating the channel frequency plan for an example full-service cable modem system.

In this example, also referring to FIG. 3, there are two downstream channels: the downstream control and payload channel DCPC 147 and the downstream payload channel DPC1 137, and the five upstream channels: the upstream control channels UCC1 174, UCC2 176, UCC3 178 and the upstream payload channels UPC1 182 and UPC2 184. The exemplified channel frequencies are illustrated in FIG. 3, in which channel center frequencies for the DCPC 147, the DPC1 137, the UCC1 174, the UCC2 176, the UCC3 178, the UPC1 182 and the UPC2 184 correspond to f1, f2, f3, f4, f5, f6, f7 respectively. The center frequencies for the DCPC 147 and the DPC1 137 are controlled by corresponding frequency-agile up-converters 146 and 136. The UCCs 174, 176 and 178 channel center frequencies and channel bandwidths are controlled by a burst transmitter 194. The UPCs 182 and 184 center frequencies and channel bandwidths are controlled by another burst transmitter 196. Illustratively, the UCCs use narrower channel bandwidths and robust modulation schemes such as QPSK or BPSK that can be located in the noisier portion of the upstream spectrum. The "cleaner" part of the upstream spectrum is normally used by the UPCs so that higher order of modulations such as 16 to 64 QAM can be used reliably for higher throughput for payloads. In an alternative embodiment, a single upstream frequency-agile programmable burst transmitter can multiplex the transmission of control and payload bursts.

Through an IP network interface 122, the fsCMTS 102 is connected to a video server 108 via a communication path 120 for digital video services, to a managed Internet backbone 112 for connection to a Public Switched Telephone Network PSTN 113, or other voice-over-IP networks for telephony services, to an Internet backbone 114 for high-speed data services, and to an Intranet IP network 116 for access to provisioning and network management servers as part of the fsCMTS system operation. The IP network interface is also connected to the video server 108 for providing IP connectivity for video-related network management and illustratively, for upstream traffic generated by set-top boxes 530.

Digital video traffics, generated by the video server 108, packetized into MPEG-2 transport streams TS 150, 152 are combined with fsCMTS MAC messages 131 and 160 including Synchronization SYNC 500, Calibration Request CREQ 600, Calibration Response CRSP 700, Bandwidth Request BREQ 800, and the Multi-channel Bandwidth Allocation MMAP 900, the fsMAC Domain Channels Descriptor MDCD 1000 and IP payload packets 154 and 155 in downstream transmitters 132, 142, which are outputted to downstream modulators 134, 144. The intermediate frequency outputs of the modulators 134, 144 are up converted to the desired center frequencies by up converters 136 and 146 respectively. The radio frequency RF outputs of the up converters 136 and 146 are then transmitted through the HFC plant 104 into downstream receivers 470, 420 of fsCMs 106 via the coaxial 402 portion of the HFC 104.

The downstream modulators 134, 144 typically are specified to comply with ITU J83 Annex A, B, or C depending on nationality. Other modulation and forward error correction (FEC) formats are possible.

IP packets 154 and 155, and MAC management packets 131 and 160 are encapsulated in MPEG2-TS using a unique packet identifier PID (1FFE hexadecimal for data-over-cable) before transmitting downstream.

The time base in the fsCMTS 102 and in the remote fsCMs 106 are synchronized by periodically sending a captured time-stamp value of a time-stamp counter 130 driven by a time-stamp frequency source 128. The time-stamp value is encapsulated in a MAC management message (SYNC 500), which is in turn encapsulated into a MPEG2-TS and multiplexed with the other TS before delivering to the downstream modulator 134. The method of synchronization using time-stamped message is known in the art.

The SYNC 500 is transmitted in all downstream channels so as to enable seamless switching of downstream channels.

The downstream control and Payload channel DCPC 147 carries MAC management messages including a MMAP 900 and MDCD 1000 which are essential for the multi-channel MAC operation and their significance will be understood when they are described in detail below.

A full-service MAC (fsMAC) has two parts: a fsMAC-CM 192 and a fsMAC-CMTS 124, which are located in the fsCM 106 and fsCMTS 102 respectively. The fsMACs role is to co-ordinate the dispatch of downstream IP packets and fsMAC management messages; another role is to co-ordinate the efficient and orderly transmission of upstream bursts using the two upstream burst transmitters 194 and 196.

One of the transmitters 194 is used for transmitting fsMAC management packets such as calibration and bandwidth requests. The other transmitter 196 is for transmitting payload of IP packets 199 received from a CPE interface 197.

More specifically, the transmitter 194 is used to transmit bursts to UCC1 174, UCC2 176 or UCC3 178 using burst profiles communicated to fsMAC-CM 192 by fsMAC-CMTS 124 by sending down the MDCD 1000. Similarly, the transmitter 196 is used to transmit bursts to UPC1 182 or UPC2 184 using other burst profiles. The fsCM 106 learns the characteristics of burst profiles by listening to the MDCD message 1000 and uses the burst profile and time to transmit by decoding the MMAP message 900.

At the fsCMTS 102, corresponding to these transmitters in the fsCM 106, there are matching frequency-agile programmable burst receivers 172 and 180 that will tune, demodulate and recover the packets received. These packets (including collision detection information, if any) will be inputted to the fsMAC-CMTS 124.

Full-Service Cable Modem Detail

Figure 2:
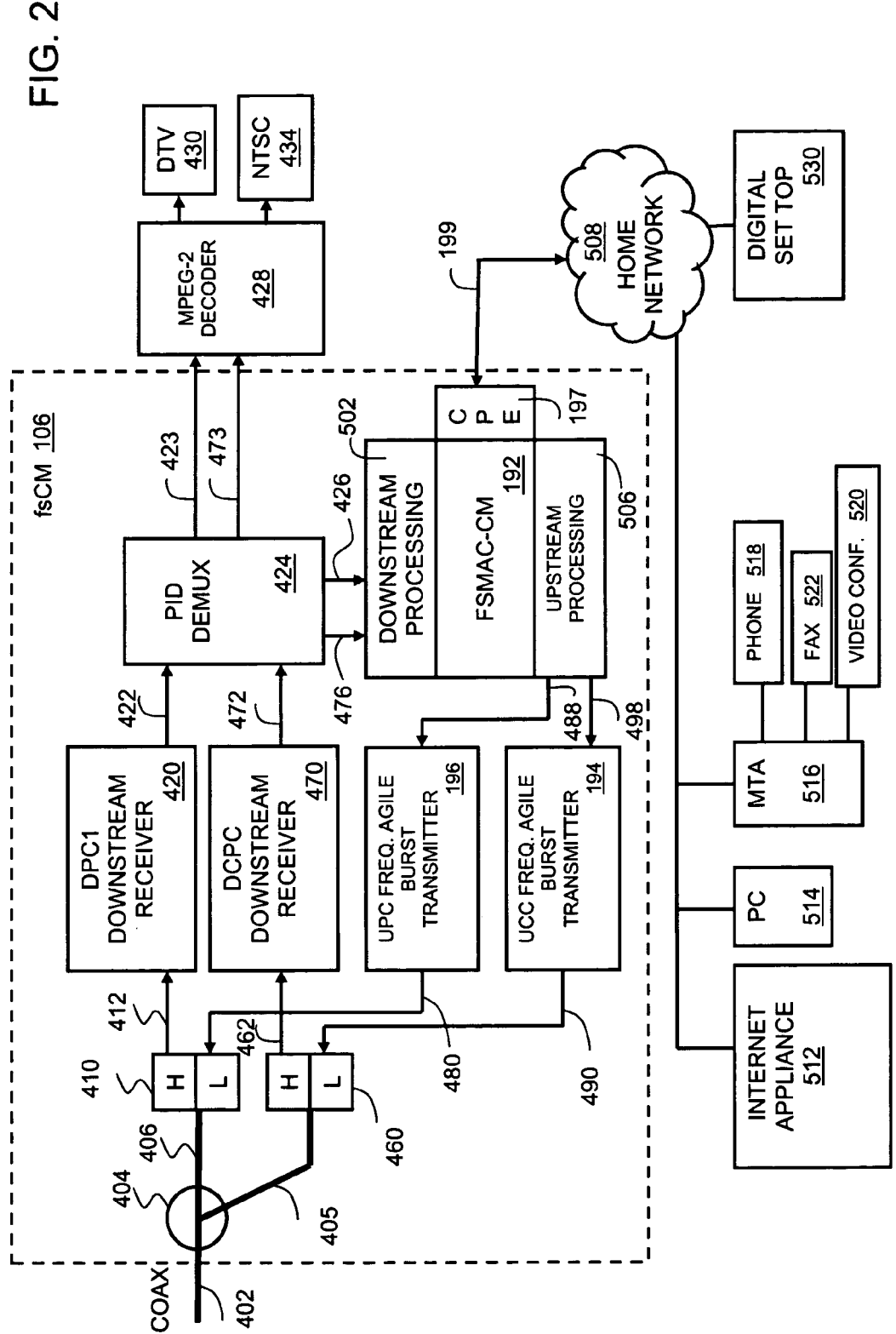
FIG. 2 is a block diagram of the full-service cable modem 106.

FIG. 2 is a block diagram illustrating an embodiment of the fsCM 106. The RF signal enters the fsCM 106 via the coax 402. The RF is divided into two paths by RF splitter 404. Each RF path after the splitter is connected to diplex filters 410, 460. Diplex filer 410 passes high frequency downstream RF signal 412 to the DPC1 downstream receiver 420, whose output is a MPEG-2 transport stream TS1 422 into a packet identifier (PID) de-multiplexing unit 424. De-multiplexing unit 424 separates the data-over-cable TS 426 from the conventional audio/video/data TS 423 by examining the PID value. Data-over-cable TS 426 is identified by a value of 1FFE (hexadecimal). The audio/video/data TS 423 associated with a program (e.g. movie) is directed to a conventional MPEG-2 decoder 428 for generating audio/visual signals. Outputs from the decoder 428 can be of digital television DTV 430, or standard analog video signal 434 (composite video or NTSC modulated RF) for connection to conventional television receivers or video monitors.

Alternatively, the TS 423 can interface to a digital set-top box using IEEE 1394 (not shown), or other high-speed connections. Another alternative is to send the MPEG-2 audio/video/data TS 476 to the fsMAC-CM 192, where the TS is encapsulated in IP (MPEG-2 over IP) and forwarded to a home network 508 via CPE interface 504. The digital set-top box 530 attached to the home network 508 can decode the MPEG-2 TS.

Another RF path 405 passes through diplex filter 460 that outputs a RF signal 462, which is tuned to the channel DCPC 147 and processed by the second downstream receiver 470, whose output is another MPEG-2 transport stream TS 472, which is inputted to the PID de-multiplexing unit 424, which in turn separates the data-over-cable TS 426 from the audio/video/data TS 473.

Data-over-cable TS 426 and 476 are processed in a downstream processing unit 502 to recover data-over-cable packets, consisting of MAC messages and IP payload packets, before entering a fsMAC-CM. MAC messages are processed by the fsMAC-CM 192. IP payload packets are forwarded to CPE devices attached to the home network 508, subjected to filtering rules by the CPE interface 197, which is illustratively, an Ethernet network interface. Specifically, IP packets are subjected to filtering rules in the packet forwarding engine within the CPE interface 197 using bridging or routing rules. The IP packets are forwarded to a CPE devices such as a personal computer 514, an Internet Appliance 512, Multimedia Terminal Adaptor (MTA) 516 for voice-over-IP telephone 518, FAX machine 522, video conferencing terminal 520 and other media streaming services using the home networking infrastructure 508 (e.g. 10/100 Base-T Ethernet, USB, HPNA, Wireless LAN, HomePlug etc.)

Upstream IP packets from CPE devices 512, 514, 516, 530 are subjected to filtering by the packet forwarder within the CPE interface 197, and then are queued at upstream processing unit 506. There are two upstream burst transmitters in this embodiment: the Upstream Control Channel (UCC) 194 and the Upstream Payload Channel (UPC) 196. Each of the two transmitters consists of FEC encoder, modulator, frequency agile digital up converter, RF front-end, etc. to enable upstream burst transmissions in any channel in the upstream spectrum, according to the stored burst profiles sent from the fsCMTS 102.

Upstream MAC management burst packets 498 are sent to UCC channel transmitter 194, which outputted as RF burst signal 490 to the diplex filter 460. Payload IP packets 488 emerges from an upstream processing unit 506, accordingly processed by the UPC burst transmitter 196, whose output burst RF signal 480 is coupled to the diplex filter 410 and emerges as a RF signal 405, which is coupled to the HFC coax 402 by splitter 404, traveling upstream to the head end 101 where the fsCMTS 102 is located.

Now the signal flow of the fsCM system 100 between the fsCMTS 102 and fsCM 106 has been described. The following further description will show how the fsMAC-CMTS 124 and fsMAC-CM 192 coordinate the multiple access transmission of upstream bursts. The essential MAC management messages SYNC 500, MDCD 1000, MMAP 900, CREQ 600, CRSP 700, BREQ 800 are described first and then the fsMAC protocol details will follow.

Full-Service MAC Management Messages
SYNC Message

FIG. 4 is a block diagram of the SYNC MAC message 500 structure. The SYNC MAC message 500 includes a MAC management header 582, a time stamp snapshot 584 capturing the sampled value of time stamp counter 130, a fsMAC domain identifier 586, and a downstream channel identifier 588. A description of the fields of the SYNC message 500 is shown in Table 1. However, fewer or additional fields could also be used in the SYNC message 500.

TABLE 1

SYNC MESSAGE 500

| Field Parameter | Description of Field Parameter |
|---|---|
| fsMAC Message Header 502 | This field allows fsCM-MAC 192 to uniquely identify and process the SYNC management message 500. |
| Time stamp snapshot 504 | This field contains the sampled value of time stamp counter 130. |
| FsMAC domain identifier 506 | This field uniquely identifies the fsMAC domain as defined by MMAP message 900. |
| Downstream Channel identifier 508 | This field uniquely identifies the downstream channel to which fsMAC messages are transmitted. |

CREQ Message

FIG. 5 is a block diagram of the calibration request (CREQ) MAC message 600 structure. The CREQ MAC message 600 includes a MAC management header 602, a fsCM service identifier 604, a fsMAC domain identifier 606, a downstream channel identifier 608, a fsCM Ethernet MAC address 610, a fsCM type 612, and a pre-equalizer training sequence 614.

A description of the fields of the CREQ message 600 is shown in Table 2.

However, fewer or additional fields could also be used in the CREQ message 600 in other embodiments.

TABLE 2

CREQ MESSAGE 600

| Field Parameter | Description of Field Parameter |
|---|---|
| fsMAC Message Header 602 | This field allows fsCM-MAC 192 to uniquely identify and process the CREQ message 600. |
| fsCM service identifier (SID) 604 | This field uniquely identify the service flow associated with the fsCM 106 within the fsMAC domain identified by fsMAC domain ID 606 |
| fsMAC domain identifier (MAC ID) 606 | This field uniquely identifies the fsMAC domain as defined by MMAP message 900. |
| DCPC channel identifier 608 | This field uniquely identifies the downstream control and payload channel (DCPC) into which fsMAC messages are transmitted |
| Ethernet MAC address 610 | This field contains the 48-bit Ethernet MAC address associated with the fsCM 106 |
| FsCM type 612 | This field contains information about the type and version of the fsCM 106 |
| Pre-equalizer training sequence 614 | This field contains pre-equalizer training sequence(s) for the fsCM 106 transmitters 194, 196. |

CRSP Message

FIG. 6 is a block diagram of the calibration response MAC message 700 structure. The CRSP MAC message structure 700 includes a MAC management header 702, a fsCM service identifier 704, a fsMAC domain identifier 706, an upstream channel identifier 708, a timing adjustment 710, a frequency adjustment 712, a transmit power adjustment 714, transmitter pre-equalizer tap coefficients 716, and a re-assigned fsMAC domain identifier 718.

A description of the fields of the CRSP message 700 is shown in Table 3. However, fewer or additional fields could also be used in the CRSP message 700 in other embodiments.

TABLE 3

CRSP MESSAGE 700

| Field Parameter | Description of Field Parameter |
|---|---|
| fsMAC Message Header 702 | This field allows fsCM-MAC 192 to uniquely identify and process the CRSP message 700. |
| fsCM service identifier (SID) 704 | This field uniquely identify the service flow associated with the fsCM 106 within the fsMAC domain identified by fsMAC domain ID 706 |
| fsMAC domain identifier (MAC ID) 706 | This field uniquely identifies the fsMAC domain as defined by MMAP message 900. |
| Upstream channel identifier 708 | This field identifies the upstream channel CRSP 700 is responding to. |
| Timing adjustment 710 | This field contains information for fsCM 106 to adjust its local clock to synchronize with that of fsCMTS |
| Frequency adjustment 712 | This field contains information for fsCM 106 to adjust its upstream transmitter center frequency to within the receiving frequency range of the fsCMTS receiver. |
| Transmit power adjustment 714 | This field contains information for fsCM 106 to adjust its transmitter power amplifier gain to the correct level. |
| Transmit pre-equalizer tap coefficients 716 | This field contains information for fsCM 106 to adjust its transmitter pre-equalizer to this new parameters. |
| Reassigned fsMAC domain identifier 718 | This field contains information (if present) about a new fsMAC domain identifier, which fsCM 106 will associate with after receiving this message. |

BREQ Message

FIG. 7 is a block diagram of the bandwidth request (BREQ) MAC message 800 structure, which includes a fsMAC message header 802, a fsCM service identifier 804, a fsMAC domain identifier 806, a framing header type 808, and an amount requested 810.

A description of the fields of the BREQ message 800 is shown in Table 4. However, fewer or additional fields could also be used.

TABLE 4

BREQ MESSAGE 800

| Field Parameter | Description of Field Parameter |
|---|---|
| FsMAC Message Header 802 | This field allows fsCM-MAC 192 to uniquely identify and process the BREQ message 800. |
| fsCM service identifier (SID) 804 | This field uniquely identify the service flow associated with the fsCM 106 within the fsMAC domain identified by fsMAC domain ID 806 |
| fsMAC domain identifier (MAC ID) 806 | This field uniquely identifies the fsMAC domain as defined by MMAP message 900. |
| Framing header type 806 | This field contains the header type information for fsCMTS to take into consideration of the MAC frame header overhead when allocating bandwidth for the requesting fsCM. |
| Amount requested 810 | This field contains amount of payload bandwidth (excluding MAC header overhead) requested by fsCM. E.g. number of bytes or number of time slots such as mini-slots. |

MMAP Message

FIG. 8 is a block diagram of the multi-channel bandwidth allocation MAC message (MMAP) 900 structure, which includes a fsMAC management message header 902, a fsMAC domain identifier 904, a list of broadcast grants 906, a list of unicast grants 908, and a list of pending grants 910.

A description of the fields of the MMAP message 900 is shown in Table 5. However, fewer or additional fields could also be used.

TABLE 5

MMAP MESSAGE 900

| Field Parameter | Description of Field Parameter |
| --- | --- |
| fsMAC Message Header 902 | This field allows fsCM-MAC 192 to uniquely identify and process the MMAP message 900. |
| fsMAC domain identifier 904 | This field uniquely identifies the fsMAC domain |
| Broadcast grants 906 | This field contains the bandwidth grants for the contention area that bandwidth requests are transmitted from any fsCM in the fsMAC domain. Table 6 gives an example of the broadcast grants |
| Unicast grants 908 | This field contains the bandwidth grants address to an individual fsCM. Table 7 gives and example of unicast grants. |
| Pending grants 910 | This field contains a list of pending grants for those BREQ's that are successfully received by the fsCMTS, but the grants are deferred to a later MMAP 900. Table 8 gives an example of pending grants |

TABLE 6

Broadcast grants 906 example

| Broadcast Grants | Description of Field Parameter |
| --- | --- |
| Number of broadcast grants | =2 in this example |
| Service ID | (Start of 1st broadcast grant). This field contains the SID of the broadcast address for all fsCM's. |
| Grant type | Bandwidth request BREQ 800 |
| Upstream channel ID | This field contains the channel ID to which the broadcast grant is allocated |
| Burst profile ID | This field identifies the burst profile of BREQ 800 |
| Back-off start and End values | This field contains the back-off window of the chosen contention resolution algorithm |
| Length of payload data in bytes | BREQ 800 burst payload data length in bytes |
| Number of bursts | Number of BREQ 800 bursts for this grant |
| Transmission start time | Start transmission time of the first BREQ 800 burst |
| Service ID | (Start of 2nd broadcast grant). This field contains the SID of a broadcast address for a group of fsCM's. |
| Grant type | Bandwidth request BREQ 800 |
| Upstream channel ID | This field contains the channel ID to which the broadcast grant is allocated |
| Burst profile ID | This field identifies the burst profile of the BREQ 800 |
| Back-off start and End values | This field contains the back-off window of the chosen contention resolution algorithm in this example |
| Length of payload data in bytes | BREQ 800 burst payload data length in bytes |
| Number of bursts | Number of BREQ 800 bursts for this grant |
| Transmission start time | Start transmission time of the first BREQ 800 burst |

TABLE 7

Unicast grants 906 example

| Unicast Grants | Description of Field Parameter |
| --- | --- |
| Number of Unicast grants | 3 in this example |
| SID-1 | (Start of 1st unicast grant). This field contains SID of fsCM-1. |
| Grant type | Variable length payload packet |
| Upstream channel ID | This field contains the channel ID to which the unicast grant is allocated |
| Burst profile ID | This field identifies the burst profile for packet |
| Burst framing header type | This field contains framing header type to enable fsCMTS to calculate the overhead needed for the burst |
| Length of payload data in bytes | Burst payload data length in bytes |
| Transmission start time | Start transmission time of the first BREQ 800 burst |
| SID-2 | (Start of 2nd unicast grant). This field contains SID of fsCM-2. |
| Grant type | Constant bit rate (CBR) |
| Upstream channel ID | This field contains the channel ID to which the unicast grant is allocated |
| Burst profile ID | This field identifies the burst profile for this burst |
| Burst framing header type | This field contains framing header type to enable fsCMTS to calculate the overhead needed for the burst |
| Length of payload data in bytes | Burst payload data length in bytes |
| Grant interval | This field contains the time interval between two adjacent grants |
| Transmission start time | Start transmission time of the burst |
| SID-3 | (Start of 3rd unicast grant). This field contains SID of fsCM-3. |
| Grant type | Dedicated channel |
| Upstream channel ID | This field contains the channel ID to which the unicast grant is allocated |
| Length of payload data in bytes | Burst payload data length in bytes |
| Grant duration | This field contains the time for which the dedicated channel can be used |
| Transmission start time | Start transmission time of the first burst |

TABLE 8

Pending grants 910 example

| Pending Grants | Description of Field Parameter |
| --- | --- |
| Number of broadcast grants | =2 in this example |
| SID-a | This field contains the SID of the pending grant for fsCM-a. |
| SID-b | This field contains the SID of the pending grant for fsCM-b. |

MDCD Message

FIG. 9 is a block diagram of the fsMAC domain channel descriptor (MDCD) MAC message structure 1000, which includes a MAC message header 1002, a fsMAC domain identifier 1004, an accept new fsCM registration flag 1006, number of downstream channels 1008, number of upstream channels 1010, downstream channel change count 1012, upstream channel change count 1014, a list of downstream channel identifiers and Type-Length-Values (TLVs) 1026, a list of upstream channel identifiers and TLVs 1028, and a list of upstream burst profile identifiers and TLVs 1030.

A description of the fields of the MDCD message 1000 is shown in Table 9. However, fewer or additional fields could also be used.

TABLE 9

MDCD MESSAGE 1000

| Field Parameter | Description of Field Parameter |
|---|---|
| fsMAC Message Header 1002 | This field allows fsCM-MAC 192 to uniquely identify and process the MDCD message 1000. |
| FsMAC domain identifier 1004 | This field uniquely identifies the fsMAC domain as defined by MMAP message 900. |
| Accept-new-fsCM-registration flag 1006 | This field contains a flag bit which when set, indicating the fsMAC domain is accepting new fsCM 106 registration. |
| Number of downstream channels 1008 | This field contains N number of downstream channels in the fsMAC domain. |
| Number of upstream channels 1010 | This field contains M number of upstream channels in the fsMAC domain. |
| Downstream channel change count 1012 | This field contains a count of changes in downstream channel configuration. If this field is different than the count in the previous MDCD message 1000, fsCM's 106 in the fsMAC domain must update its downstream channel configuration to the current MDCD message 1000. |
| Upstream channel change count 1014 | This field contains a count of changes in upstream channel configuration. If this field is different than the count in the previous MDCD message 1000, fsCM's 106 in the fsMAC domain must update its upstream channel configuration to the current MDCD message 1000. |
| List of downstream channel identifiers and TLV's 1026 | This field contains a list of N downstream channel identifiers and the associated TLV's defining the channel parameters. Table 10 shows an example of a list of 2 downstream channels. |
| List of upstream channel identifiers and TLV's 1028 | This field contains a list of M upstream channel identifiers and the associated TLV's defining the channel parameters. Table 11 shows an example of a list of 5 upstream channels. |
| List of upstream burst profile identifiers and TLV's 1030 | This field contains a list of X upstream burst profile identifiers and the associated TLV's defining the burst parameters. Table 12 shows an example of a list of 3 burst profiles. |

TABLE 10

Downstream channel identifiers and TLV's 1026 example

Number of downstream channels = 2

| downstream channel parameter type | TLV encoding | | | |
|---|---|---|---|---|
| | Type (1 byte) | Length (1 byte) | Value (L bytes) | Description |
| Downstream channel identifier | 1 | 1 | 01 | 01 (Channel ID) |
| Downstream channel type | 2 | 1 | 1 | 1 (DCPC) |
| Center frequency | 3 | 4 | f1 | Hz |
| Symbol rate | 4 | 1 | 0 | 0 (5.056941 M symbols/sec) |
| FEC | 5 | 1 | 1 | 1 (J83 Annex B) |
| Modulation | 6 | 1 | 0 | 64 QAM |
| Interleave depth (I, J) | 7 | 2 | 16, 8 | Latency = 0.48 ms |
| Downstream channel identifier | 1 | 1 | 02 | 02 |
| Downstream channel type | 2 | 1 | 2 | 2 (DPC1) |
| Center frequency | 3 | 4 | f2 | Hz |
| Symbol rate | 4 | 1 | 1 | 1 (5.360537 M symbols/sec) |
| FEC | 5 | 1 | 1 | 1 = J83 Annex B |
| Modulation | 6 | 1 | 1 | 256 QAM |
| Interleave depth (I, J) | 7 | 2 | 128, 1 | Latency = 2.8 ms |

TABLE 11

Upstream channel identifiers and TLV's 1028 example

Number of upstream channels = 5

| Upstream channel parameter type | TLV encoding | | | |
|---|---|---|---|---|
| | Type (1 byte) | Length (1 byte) | Value (L bytes) | Description |
| Upstream channel identifier | 1 | 1 | 10 | 10 |
| Upstream channel type | 2 | 1 | 0 | 0 (UCCI) |
| Center frequency | 3 | 4 | f3 | Hz |
| Symbol rate | 4 | 1 | 0 | 0 (640K symbols/sec) |
| Upstream channel identifier | 1 | 1 | 11 | Channel ID = 11 |
| Upstream channel type | 2 | 1 | 1 | 1 (UCC2) |
| Center frequency | 3 | 4 | f4 | Hz |
| Symbol rate | 4 | 1 | 2 | 2 (320K symbols/sec) |
| Upstream channel identifier | 1 | 1 | 12 | Channel ID = 12 |
| Upstream channel type | 2 | 1 | 2 | 2 (UCC3) |
| Center frequency | 3 | 4 | f5 | Hz |
| Symbol rate | 4 | 1 | 3 | 3 = 640K symbols/sec |
| Upstream channel identifier | 1 | 1 | 13 | Channel ID = 13 |
| Upstream channel type | 2 | 1 | 3 | 3 (UPC1) |
| Center frequency | 3 | 4 | f6 | Hz |
| Symbol rate | 4 | 1 | 6 | 6 = 5.12 M symbols/sec |
| Upstream channel identifier | 1 | 1 | 14 | Channel ID = 14 |
| Upstream channel type | 2 | 1 | 4 | 4 (UPC2) |
| Center frequency | 3 | 4 | f7 | Hz |
| Symbol rate | 4 | 1 | 6 | 6 = 5.12 M symbols/sec |

TABLE 12

Upstream burst profile identifiers and TLV's example

Number of upstream burst profiles = 3

| upstream burst parameter type | TLV encoding | | | |
|---|---|---|---|---|
| | Type (1 byte) | Length (1 byte) | Value (L bytes) | Description |
| Burst identifier | 1 | 1 | 11 | Burst profile 1 |
| Modulation | 2 | 1 | 0 | 0 = QPSK |

TABLE 12-continued

Upstream burst profile identifiers and TLV's example

Number of upstream burst profiles = 3

TLV encoding

| upstream burst parameter type | Type (1 byte) | Length (1 byte) | Value (L bytes) | Description |
|---|---|---|---|---|
| Preamble length | 3 | 2 | 64 | 64 bytes |
| FEC code word (k) | 4 | 1 | 78 | 13 bytes |
| FEC error correction (T) | 5 | 1 | 6 | T = 2 bytes |
| Scramble seed | 6 | 2 | 35 | Seed = 00110101 |
| Inter-burst guard time | 7 | 1 | 5 | 5 symbols |
| burst identifier | 1 | 1 | 12 | Burst profile 2 |
| modulation | 2 | 1 | 0 | 0 = QPSK |
| Preamble length | 3 | 2 | 64 | 64 bites |
| FEC code work (k) | 4 | 1 | 78 | 78 bytes |
| FEC error correction (T) | 5 | 1 | 6 | T = 6 bytes |
| Scramble seed | 6 | 2 | 35 | Seed = 00110101 |
| Inter-burst guard time | 7 | 1 | 5 | 5 symbols |
| burst identifier | 1 | 1 | 13 | Burst profile 3 |
| Modulation | 2 | 1 | 0 | 0 = 64 QAM |
| Preamble length | 3 | 2 | 64 | 128 bites |
| FEC code work (k) | 4 | 1 | 78 | 256 bytes |
| FEC error correction (T) | 5 | 1 | 6 | T = 10 bytes |
| Scramble seed | 6 | 2 | 35 | Seed = 00110101 |
| Inter-burst guard time | 7 | 1 | 5 | 5 symbols |

Full-Service Cable Modem System Operation

For this exemplified embodiment, the fsCMTS sets up the fsCM domain comprising:

Two Downstream Channels:

1. The DCPC 147 is the broadcast channel for all the fsCMs within the fsCM domain, and is configured to ITU-T J83 Annex B standard with 64 QAM modulation and at a center frequency of f1 Hz in the downstream spectrum as shown in FIG. 3. This channel is primarily used for data-over-cable MAC management messages, IP traffic and to a less extent, MPEG-2 video delivery.

2. The DPC1 137 is the broadcast channel for all the fsCMs within the fsCM domain, and is configured to be ITU-T J83 Annex B standard with 256 QAM modulation and at a center frequency of f2 Hz in the downstream spectrum as shown in FIG. 3. This channel is primarily used for broadcast quality MPEG-2 movie delivery, but also carries IP packets.

Three Upstream Control Channels:

1. The UCC1 174 used for contention bandwidth requests for all or a group of said fsCMs, is configured to operate at 640 Ksymbols/sec with QPSK modulation and at a center frequency of f3 Hz in the upstream spectrum as shown in FIG. 3.

2. The UCC2 176 used for contention calibration and maintenance for all or a group of said fsCMs, is configured to operate at 320 Ksymbols/sec with QPSK modulation and at a center frequency of f4 Hz in the upstream spectrum as shown in FIG. 3.

3. The UCC3 178 used for Aloha contention, pay-per-view or video-on-demand request burst for all or a group of said fsCMs, is configured to operate at 640 Ksymbols/sec with QPSK modulation and at center frequency of f5 Hz in the upstream spectrum as shown in FIG. 3.

Two upstream payload channels:

1. The UPC1 182, intended primarily for voice-over-IP CBR traffic for all or a group of said fsCMs, is configured to operate at 5.12 Msymbols/sec with 16 QAM modulation and at a center frequency of f6 Hz in the upstream spectrum as shown in FIG. 3.

2. The UPC2 184 is intended primarily for high-speed data and media streaming traffic for all or a group of said fsCMs 106 is configured to operate at 5.12 Msymbols/sec with 16 QAM modulation and at a center frequency of f7 Hz in the upstream spectrum as shown in FIG. 3.

When the fsCMTS 102 is operational, the following MAC management messages are broadcast periodically to all the fsCMs 106 to establish a fsCM domain, in the HFC 104 via the DCPC 147:

1. SYNC 500, typically sent every 150 to 250 ms,
2. MDCD 1000, typically sent every 1 to 2 seconds, and
3. MMAP 900, typically sent every 2 to 10 ms.

SYNC 500 establishes network-wide clock synchronization of the fsCMTS 102 and the fsCMs 106 using a conventional time-stamp methodology which is known in the art. The MDCD 1000 establishes the fsMAC domain using the fsMAC domain identifier 1004. The MDCD 1000 also contains the parameters needed by the fsCMs 106 to join the fsMAC domain by setting up the channel and burst profiles. The MMAP 900 contains information about upstream transmission opportunities on a specific channel, using a specific burst profile, a duration of the transmission time, and at a specific start time to transmit. The MMAP 900 also contains upstream transmission opportunities, typically once every 1 to 2 seconds, for the fsCM 106 that wishes to join the network to transmit the CREQ 600 to adjust its ranging offset, center frequency, transmitter power level, and transmitter pre-equalizer coefficients etc. as part of the initialization process. Once initialized, the fsCM 106 starts to use the contention-based CREQ 600 to request transmission of payload packets.

Full-Service Cable Modem Initialization

Figure 10:
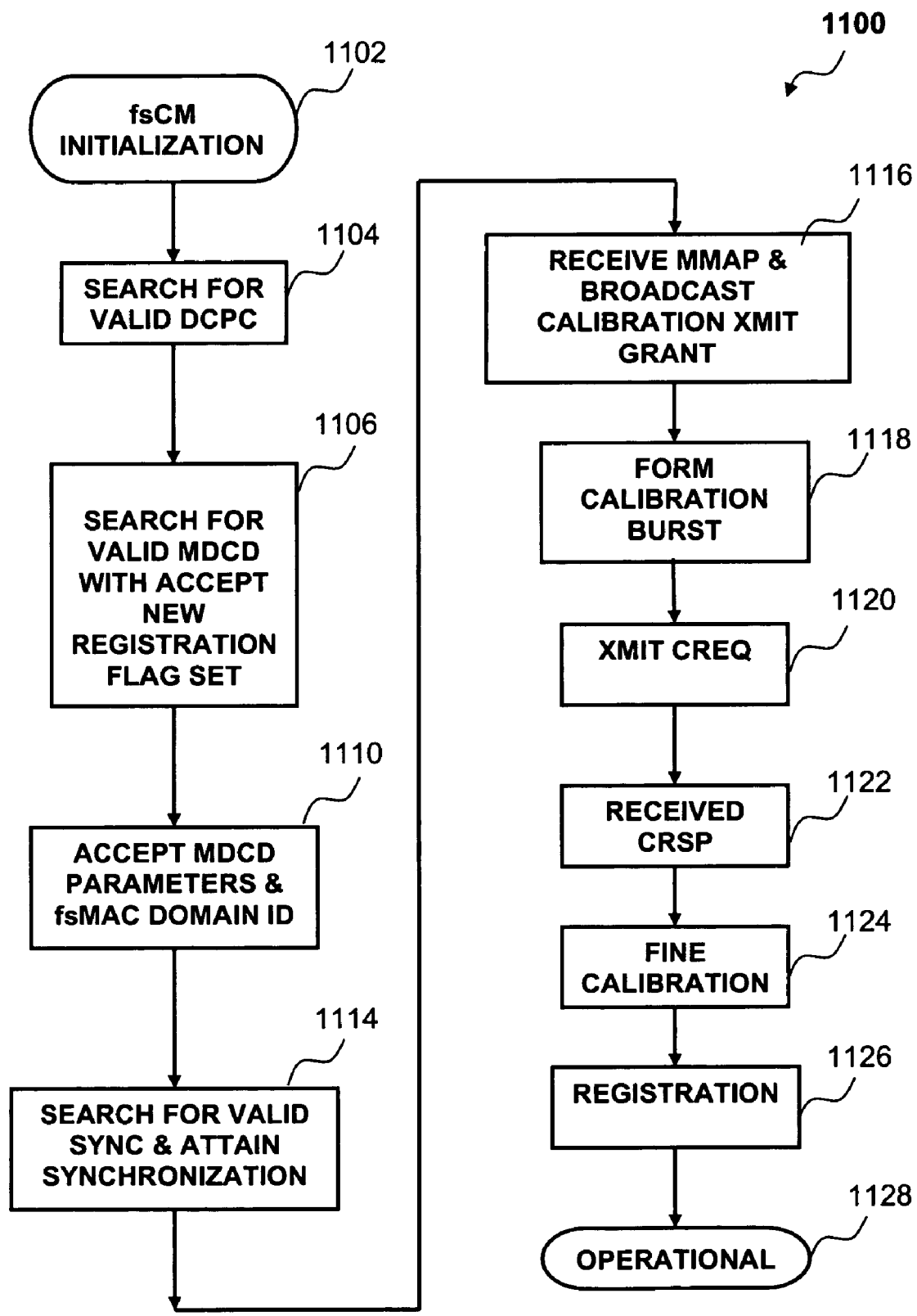
FIG. 10 is a flow diagram illustrating of the fsCM initialization.

Referring to FIG. 10, a fsCM initialization flow diagram 1100 is entered at a block 1102 when the fsCM 106 is powered up or reset. In a block 1104, the DCPC receiver 470 at the fsCM 106 is continuously searching for a valid DCPC channel. The DCPC is considered to be valid if MPEG-2 TS with a valid data-over-cable PID (e.g. 1FFE hexadecimal) is found. Once found, block 1106 is entered to search for the valid MDCD 1000. In the MDCD 1000, the flag 1006, if set, signifies that the DCPC is accepting the new fsCM 106 registrations, and a block 1110 is entered. If the flag 1006 is not set, signifying the MDCD 1000 is not taking in new registrations, the fsCM 106 will exit the block 1106 and enter a block 1104 for searching for another valid DCPC.

In the block 1110, all the parameters in the MDCD 1000 are accepted by the fsCM 106. The fsMAC domain identifier 1004 will be used to match the fsMAC domain identifier 586 in the SYNC 500 in block 1114. If the valid SYNC 500 is received, the fsCM 106 will synchronize its time base with the fsCMTS time base. The fsCM 106 initializes the other downstream and upstream channels, the burst profiles, based on information received in the MDCD 1000 and enters a block 1116.

In the block 1116, the fsCM 106 monitor the MMAP 900 for broadcast calibration grant as shown in Table 6. In this example, the second broadcast grant is for CREQ 600. In the block 1116, if a CREQ 600 grant is received, a block 1118 will be entered, and the fsCM 106 will construct a calibration burst based on the burst profile, and length of payload information in the received broadcast grant 906.

In a block 1120 the CREQ 600 burst will then be transmitted at the specified upstream channel at the specified transmission start time (subject to back-off based on the back-off start and end values specified in the grant using exponential back-off algorithm). If a calibration response the CRSP 700 is received by the fsCM 106 in a block 1122, the initial calibration is successful and a fine calibration block 1124 is entered. If no CRSP 700 is received in the block 1122, after a pre-determined time-out, a block 1116 will be entered and the CREQ 600 process will be retried (not shown).

In a block 1124, the fsCMTS 102 will do fine calibration on each of the upstream channels in the fsCM domain by sending a periodic unicast fine calibration grant to the fsCM 106 for each upstream channel. In the block 1124 the fine-calibration process is complete after receiving the CRSP 700 from the fsCMTS 102 and after the fsCM 106 has adjusted its upstream channel parameters ranging offset, frequency, power level, and pre-equalizer coefficients etc. These parameters will be saved in the fsCM 106 upstream channel profiles and they will be used to configure the channel before a burst transmission. After fine calibration, a block 1126 is entered. The fsCM 106 completes the modem registration process and becomes operational in a block 1128.

Transmission Using Bandwidth Request

Figure 11:
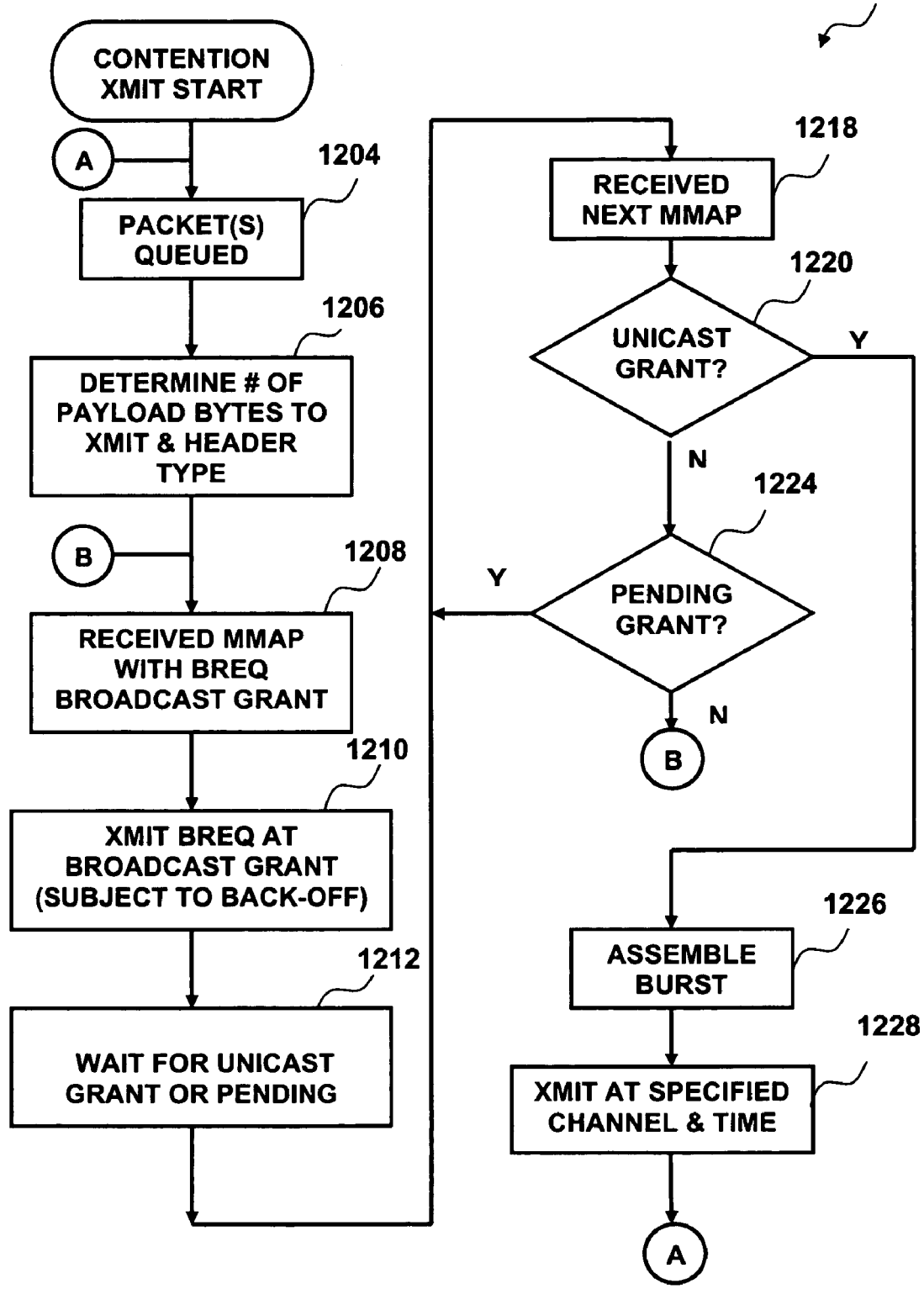
FIG. 11 is a flow diagram illustrating the upstream transmission process using contention BREQ 800.

Referring to FIG. 11, which is a flow diagram of packet transmission using contention-based bandwidth request 1200. In a block 1204, one or more packets are queued up at the fsCM 106. In a block 1206 the fsMAC-CM 192 chooses one or more of packets to transmit. The number of bytes of payload and header type (e.g. short, long or concatenated) are determined. In a block 1208, the fsCM 106 waits until the MMAP 900 is received with the broadcast grant 906 (example in Table 6). Entering a block 1210, the fsCM 106 uses the back-off start and end values to calculate the initial back-off of burst transmission (any back-off algorithm will work and is well-known in the art). If the back-off algorithm determines the transmission opportunity is beyond the current grant, the fsCM 106 will defer the transmission to the next MMAP 900; otherwise, referring to Table 6, 1st broadcast grant, the fsCM 106 calculates the BREQ 800 burst transmission start time based on:

(Transmission start time)+(Burst duration calculated and based on the length of payload and header in bytes and burst profile)×number of burst deferred calculated by the back-off algorithm).

BREQ 800 will be transmitted at the calculated time at the channel specified by the upstream channel ID. A block 1212 is entered and the fsCM 106 waits for the unicast grant 908 or the pending grant 910 in the next MMAP 900. The next MMAP 900 is received in a block 1218 and is checked for the unicast grant 908 with a service identifier corresponding to the one in the original BREQ 800 in a block 1220. The unicast grant 908 will have the necessary information (channel profile, header type, and burst profile) to assemble a burst in a block 1226 and transmit the burst at the specified upstream channel at the specified transmission start time (subject to backoff) in a block 1228. If in the block 1220, no unicast grant 908 is received for the BREQ 800, the MMAP 900 is checked for existence of the pending grant 910.

In a block 1224, if there is a pending grant for the fsCM 106, the block 1218 is entered to wait for the next MMAP 900. If in the block 1224, there is no pending grant for the fsCM 106 in the MMAP 900, the BREQ 800 is considered lost or collided, and the block 1208 is entered to retry the BREQ 800 transmission.

True Seamless Channel Change

In a conventional data-over cable system, a conventional cable modem termination system (CMTS) may direct a cable modem (CM) to change its upstream channel for traffic load balancing, noise avoidance, or failed channel backup. The procedure for performing a channel change is as follows. When the CMTS determines to move a CM from the currently assigned upstream channel to another, it sends a channel change request message to the CM. In response, the CM transmits a channel change response message on the currently assigned channel to signal its readiness to use the new channel. After switching to the new channel, the CM typically performs recalibration of transmitter parameters such as ranging offset, power level, frequency and pre-equalizer coefficients before the CM can use the new channel. Such a channel switching mechanism can be very time-consuming and can take seconds or more because a complete re-calibration is often required.

According to this invention, a true seamless channel change can be achieved in the fsCM system 100. True seamless channel change means on a packet-by-packet basis, each CMTS-directed cable modem burst transmission can be at any one of the upstream channels, configured with any one of the burst profiles as defined by the fsCMTS domain 1004 in the fsMAC message MDCD 1000.

The fsCM 106 joins a fsCM domain accepting new registrations in the MDCD message 1000, which also contains fields for a list of downstream channels with channel profile parameters 1026, a list of upstream channel parameters and channel profile parameters 1028, and a list of burst profile parameters 1030. These profile parameters are uniquely identified within the fsMAC domain using downstream, upstream and burst identifiers. These parameters are stored in the fsCM, together with the channel calibration parameters for each channel as a result of calibration request/response process.

When an upstream transmission grant is received from the MMAP message 900, the grant contains sufficient information about transmission channel identifier, burst profile, size of granted and header type etc. to form an upstream burst to be transmitted at the exact start time specified in the same MMAP message 900. Thus the channel change is immediate and truly seamless.

ALTERNATIVE EMBODIMENTS

One skilled in the art can take advantage of the multi-channel fsMAC in different variations for further optimization. Examples are:

Use all downstream channels for IP packet streams, if MPEG-2 video not being needed, to further boost the downstream capacity for additional users, or for IP media streaming.

Use a single upstream control channel for channel calibrations and bandwidth requests.

Define different upstream payload channels, such as CBR channels, dedicated channels to achieve quality of service and capacity goals.

Although the teachings of the invention have been illustrated herein in terms of a few preferred and alternative embodiments, those skilled in the art will appreciate numerous modifications, improvements and substitutions that will serve the same functions without departing from the true spirit and scope of the appended claims. All such modifications, improvement and substitutions are intended to be included within the scope of the claims appended hereto.

What I claim as my invention is:

1. A method for enabling a modem termination system (MTS) to communicate with a plurality of modems using a full-service medium access control (MAC) in a shared medium network comprising:
  a. establishing via one or more downstream MAC messages, a MAC domain comprising of a plurality of downstream channels and a plurality of upstream channels, each channel utilizing a separate channel frequency, and including at least one upstream control channel that carries primarily MAC messages; wherein at least one of said MAC messages identifies a first downstream and a first upstream channel-pair carrying out MAC message exchanges between said MTS and said plurality of modems;
  b. establishing a time synchronization with said MTS via one or more synchronization downstream MAC messages from said MTS;
  c. calibrating at least one modem of said plurality of modems by at least one calibration MAC message exchange between said at least one modem of said plurality of modems and said MTS;
  d. sending via another downstream MAC message an allocation of a plurality of contention request time slots to said plurality of modems;
  e. receiving one or more bandwidth request MAC upstream messages in one or more said time slots without error from one or more said modems; and
  f. granting each of said modems in step (e), via a bandwidth grant downstream MAC message, to transmit a number of bytes in a specified upstream channel, at a specified time, with a specified burst profile.

2. The method of claim 1, wherein at least one of said downstream MAC messages further identifies all active upstream and downstream channels in said MAC domain.

3. The method of claim 2, wherein at least one of said downstream MAC messages further comprises a channel profile for each of said downstream and upstream channels.

4. The method of claim 3, wherein said downstream channel profile further comprises: a channel type, a center frequency, a symbol rate, a modulation type, a forward error correcting code (FEC), and an interleave depth.

5. The method of claim 3, wherein said upstream channel profile further comprises: a channel type, a center frequency, a symbol rate, a modulation type and a forward error correcting code (FEC).

6. The method of claim 2, wherein one of said downstream MAC messages further includes one or more burst profiles comprising: a modulation scheme, one or more preamble parameters, and one or more forward error correction (FEC) parameters.

7. The method of claim 1, wherein said bandwidth grant MAC message in step (f) further comprises: a bandwidth grant type, an upstream channel identifier, a burst profile identifier, a burst header type, a length of payload data in bytes, and a burst transmission start time.

8. The method of claim 7, wherein said bandwidth grant type is constant bit rate, and said MAC message further includes a grant interval for implicit granting of a plurality of further repetitive transmissions of burst packets after a first grant of transmission.

9. The method of claim 1, wherein said modem termination system is a cable modem termination system, and at least one of said plurality of full-service modems is a cable modem.

10. The method of claim 1, wherein at least one downstream channel of said plurality of downstream channels carries a plurality of payload packet streams having a packet type selected from the group of packet types consisting of: audio-visual MPEG-2 Transport Stream packets, data-over-cable Internet Protocol (IP) packets encapsulated in MPEG-2 Transport Stream packets with a unique Program Identifier (PID), and audio-visual streams encapsulated in IP packets.

11. The method of claim 1, wherein said full-service, multiple-access modem network system is selected from a group of networks consisting of: a two-way hybrid fiber-coax cable-television network, two way coaxial network, and a Data over Cable Service Specifications (DOCSIS) network.

12. A method for enabling a modem to communicate with a modem termination system (MTS) using a full-service medium access control (MAC) in a shared medium network comprising:
  a. establishing, via one or more downstream MAC messages from said MTS, a MAC domain comprising a plurality of downstream channels and a plurality of upstream channels, each channel utilizing a separate channel frequency, and including at least one upstream control channel that carries primarily MAC messages, wherein at least one of said MAC messages further identifies a first downstream and a first upstream channel-pair carrying out MAC message exchanges between said MTS and said modem;
  b. establishing time synchronization with said MTS via one or more synchronization downstream MAC messages from said MTS;
  c. calibrating by at least one calibration MAC message exchange with said MTS;
  d. receiving via another downstream MAC message from said MTS an allocation of a plurality of contention request time slots;
  e. transmitting a bandwidth request upstream MAC message in one of said time slots, and being received without error by said MTS;
  f. receiving a bandwidth grant downstream MAC message from said MTS to transmit a number of bytes, in a specified upstream channel, at a specified time, with a specified burst profile, if said bandwidth request MAC message has been received without error by said MTS; and
  g. re-entering step (d) for retransmitting said bandwidth request, if a bandwidth grant downstream MAC message from said MTS is not received after a predetermined time.

13. The method of claim 12, wherein said first downstream MAC message further identifies a plurality of active upstream and downstream channels in said MAC domain.

14. The method of claim 13, wherein said downstream MAC messages further comprises a channel profile for each of said plurality of active downstream and upstream channels.

15. The method of claim 13, wherein at least one of said downstream MAC messages further includes one or more burst profiles comprising: a modulation scheme, at least one preamble parameter, and at least one forward error correction (FEC) parameter.

16. The method of claim 12, wherein said bandwidth grant MAC message in step (f) further comprises: a grant type, an upstream channel identifier, a burst profile identifier, a burst header type, a length of payload data in bytes, and a burst transmission start time.

17. The method of claim 16, wherein said bandwidth grant type is a constant bit rate, and said MAC message further include a grant interval for implicit granting of a plurality of further repetitive transmissions of burst packets of a number of bytes after a first grant of transmission.

18. The method of claim 12, wherein said modem termination system is a cable modem termination system, and at least one of said plurality of full-service modems is a cable modem.

19. The method of claim 12, wherein at least one downstream channel of said plurality of downstream channels carries a plurality of payload packet streams having a packet type selected from the group of packet types consisting of: audio-visual MPEG-2 Transport Stream packets, data-over-cable Internet Protocol (IP) packets encapsulated in MPEG-2 Transport Stream packets with a unique Program Identifier (PID), and audio-visual streams encapsulated in IP packets.

20. The method of claim 12, wherein said full-service, multiple-access modem network system is selected from a group of networks consisting of: a two-way hybrid fiber-coax cable-television network, a two-way coaxial network, and a Data over Cable Service Specifications (DOCSIS) network.

21. Apparatus for enabling a modem termination system (MTS) to communicate with a plurality of modems using a full-service medium access control (MAC) in a shared medium network comprising:
   a. means for establishing via one or more downstream MAC messages, a MAC domain comprising of a plurality of downstream channels and a plurality of upstream channels, each channel utilizing a separate channel frequency, and including at least one upstream control channel that carries primarily MAC messages; wherein at least one of said MAC messages further identifies a first downstream and a first upstream channel-pair carrying out MAC message exchanges between said MTS and said plurality of modems;
   b. means for establishing time synchronization with said MTS via one or more synchronization downstream MAC messages from said MTS;
   c. means for calibrating at least one modem of said plurality of modems by at least one calibration MAC message exchange between said at least one modem of said plurality of modems and said MTS;
   d. means for sending via another downstream MAC message an allocation of a plurality of contention request time slots to said plurality of modems;
   e. means receiving one or more bandwidth request MAC upstream messages in one or more said time slots without error from one or more said modems;
   f. means for granting each of said modems in step (e), via a bandwidth grant downstream MAC message, to transmit a number of bytes in a specified upstream channel, at a specified time, with a specified burst profile.

22. The apparatus of claim 21, wherein at least one of said downstream MAC messages further identifies a plurality of active upstream and downstream channels in said MAC domain.

23. The apparatus of claim 22, wherein at least one of said downstream MAC messages further comprises a channel profile for each of said plurality of active downstream and upstream channels.

24. The apparatus of claim 22, wherein one of said downstream MAC messages further includes one or more burst profiles, each comprising: a modulation scheme, a plurality of preamble parameters, and a plurality of forward error correction (FEC) parameters.

25. The apparatus of claim 21, wherein said bandwidth grant MAC message in step (f) further comprises: a bandwidth grant type, an upstream channel identifier, a burst profile identifier, a burst header type, a length of payload data in bytes, and a burst transmission start time.

26. The apparatus of claim 25, wherein said bandwidth grant type is constant bit rate, and said MAC message further include a grant interval for implicit granting of a plurality of further repetitive transmissions of burst packets of same number of bytes after a first grant of transmission.

27. The apparatus of claim 21, wherein said modem termination system is a cable modem termination system, and at least one of said plurality of full-service modems is a cable modem.

28. The apparatus of claim 21, wherein at least one downstream channel of said plurality of downstream channels carries a plurality of payload packet streams, each having a packet type selected from the group of packet types consisting of: audio-visual MPEG-2 Transport Stream packets, data-over-cable Internet Protocol (IP) packets encapsulated in MPEG-2 Transport Stream packets with a unique Program Identifier (PID), and audio-visual streams encapsulated in IP packets.

29. The apparatus of claim 21, wherein said full-service, multiple-access modem network system is selected from a group of networks consisting of: a two-way hybrid fiber-coax cable-television network, two-way coaxial network, and a Data over Cable Service Specifications (DOCSIS) network.

30. Apparatus for enabling a modem to communicate with a modem termination system (MTS) using a full-service medium access control (MAC) in a shared medium network comprising:
   a. means for establishing via one or more downstream MAC messages from said MTS, a MAC domain comprising of a plurality of downstream channels and a plurality of upstream channels, each channel utilizing a separate channel frequency, and including at least one upstream control channel that carries primarily MAC messages; wherein at least one of said MAC messages further identifies a first downstream and a first upstream channel-pair carrying out a plurality of MAC message exchanges between said MTS and said modem;
   b. means for establishing time synchronization with said MTS via one or more synchronization downstream MAC messages from said MTS;
   c. means for calibrating by at least one calibration MAC message exchange with said MTS;
   d. means for receiving via another downstream MAC message from said MTS an allocation of a plurality of contention request time slots;
   e. means for transmitting a bandwidth request upstream MAC message in one of said time slots, and being received without error by said MTS;
   f. means for receiving a bandwidth grant downstream MAC message from said MTS to transmit a number of bytes, in a specified upstream channel, at a specified time, with a specified burst profile, if said bandwidth request MAC message having been received without error by said MTS; and
   g. means for re-entering step (d) for retransmitting said bandwidth request, if a bandwidth grant downstream MAC message from said MTS is not received after a predetermined time.

31. The apparatus of claim 30, wherein at least one of said downstream MAC messages further identifies all active upstream and downstream channels in said MAC domain.

32. The apparatus of claim 31, wherein at least one of said downstream MAC messages further comprises a channel profile for each of said downstream and upstream channels.

33. The apparatus of claim 32, wherein said channel profile of a downstream channel further comprises: a channel type, a center frequency, a symbol rate, a modulation type, a forward error correcting code (FEC), and an interleave depth.

34. The apparatus of claim 32, wherein said channel profile of an upstream channel further comprises: a channel type, a center frequency, a symbol rate, a modulation type and a forward error correcting code (FEC).

35. The apparatus of claim 30, wherein at least one of said downstream MAC messages further includes one or more burst profiles comprising: a modulation scheme, a plurality of preamble parameters, and a plurality of forward error correction (FEC) parameters.

36. The apparatus of claim 30, wherein said bandwidth grant MAC message in step (f) further comprises: a grant type, an upstream channel identifier, a burst profile identifier, a burst header type, a length of payload data in bytes, and a burst transmission start time.

37. The apparatus of claim 36, wherein said bandwidth grant type is constant bit rate, and said MAC message further includes a grant interval for implicit granting of a plurality of further repetitive transmissions of burst packets after a first grant of a transmission.

38. The apparatus of claim 30, wherein said modem termination system is a cable modem termination system, and at least one of said plurality of full-service modems is a cable modem.

39. The apparatus of claim 30, wherein at least one downstream channel of said plurality of downstream channels carries a plurality of payload packet streams having a packet type selected from the group of packet types consisting of: audio-visual MPEG-2 Transport Stream packets, data-over-cable Internet Protocol (IP) packets encapsulated in MPEG-2 Transport Stream packets with a unique Program Identifier (PID), and audio-visual streams encapsulated in IP packets.

40. The apparatus of claim 30, wherein said full-service, multiple-access modem network system is selected from a group of networks consisting of: a two-way hybrid fiber-coax cable-television network, a two-way coaxial network, and a Data over Cable Service Specifications (DOCSIS) network.

41. A network for multiple access communications between a modem termination system (MTS) and a plurality of modems using a full-service medium access control (MAC) in a shared medium network comprising:
   a. means for establishing via one or more downstream MAC messages, a MAC domain comprising of a plurality of downstream channels and a plurality of upstream channels, each channel utilizing a separate channel frequency, and including at least one upstream control channel that carries primarily MAC messages; wherein at least one of said MAC messages further identifies a first downstream and a first upstream channel-pair carrying out MAC message exchanges between said MTS and said plurality of modems;
   b. means for said MTS establishing time synchronization with each of said modems via one or more synchronization downstream MAC messages from said MTS;
   c. means for calibrating each of said plurality of modems by one or more calibration MAC message exchanges between each of said plurality of modems and said MTS;
   d. means for said MTS sending via another downstream MAC message an allocation of a plurality of contention request time slots to said plurality of modems;
   e. means said MTS receiving one or more bandwidth request MAC upstream messages in one or more said time slots without error from one or more said modems;
   f. means for said MTS granting each of said modems in step (e), via a bandwidth grant downstream MAC message, to transmit a number of bytes in a specified upstream channel, at a specified time, with a specified burst profile.

42. The network of claim 41, wherein at least one of said downstream MAC messages further identifies all active upstream and downstream channels in said MAC domain; and wherein at least one of said downstream MAC messages further comprises a channel profile for each of said downstream and upstream channels.

43. The network of claim 41, wherein said bandwidth grant MAC message in step (f) further comprises: a bandwidth grant type, an upstream channel identifier, a burst profile identifier, a burst header type, a length of payload data in bytes, and a burst transmission start time.

44. The network of claim 41, wherein at least one downstream channel of said plurality of downstream channels carries a plurality of payload packet streams having a packet type selected from the group of packet types consisting of: audio-visual MPEG-2 Transport Stream packets, data-over-cable Internet Protocol (IP) packets encapsulated in MPEG-2 Transport Stream packets with a unique Program Identifier (PID), and audio-visual streams encapsulated in IP packets.

45. The network of claim 41, wherein said network is selected from a group of networks consisting of a two-way hybrid fiber-coax cable-television network, two-way coaxial network, and a Data over Cable Service Specifications (DOCSIS) network.

46. The network of claim 41, wherein one or more of said downstream MAC messages further includes an indication of accepting registration from one or more of said modems wanting to join said MAC domain.

47. The network of claim 41 in step (c), wherein said calibration is further repeated for all active said upstream channels in said MAC domain; and calibration parameters are retained in each of said modems for each of said upstream channels.

* * * * *